(12) United States Patent
Mühlemann

(10) Patent No.: US 11,351,708 B2
(45) Date of Patent: Jun. 7, 2022

(54) INJECTION MOULDING TOOL

(71) Applicant: FOSTAG Formenbau AG, Stein am Rhein (CH)

(72) Inventor: Rolf Mühlemann, Schlattingen (CH)

(73) Assignee: FOSTAG Formenbau AG, Stein am Rhein (CH)

( * ) Notice: Subject to any disclaimer, the term of this patent is extended or adjusted under 35 U.S.C. 154(b) by 342 days.

(21) Appl. No.: 16/090,733

(22) PCT Filed: Mar. 22, 2017

(86) PCT No.: PCT/EP2017/056792
§ 371 (c)(1),
(2) Date: Oct. 2, 2018

(87) PCT Pub. No.: WO2017/174357
PCT Pub. Date: Oct. 12, 2017

(65) Prior Publication Data
US 2019/0111601 A1    Apr. 18, 2019

(30) Foreign Application Priority Data

Apr. 7, 2016 (CH) .......................... 447/16

(51) Int. Cl.
*B29C 45/28*   (2006.01)

(52) U.S. Cl.
CPC .. *B29C 45/2806* (2013.01); *B29C 2045/2858* (2013.01); *B29C 2045/2862* (2013.01); *B29C 2045/2868* (2013.01)

(58) Field of Classification Search
CPC .... B29C 2045/2862; B29C 2045/2868; B29C 45/2806; B29C 2045/2858
See application file for complete search history.

(56) References Cited

U.S. PATENT DOCUMENTS

| 10,040,228 B2 | 8/2018 | Krammer |
| 2004/0137106 A1 | 7/2004 | Ciccone |

(Continued)

FOREIGN PATENT DOCUMENTS

| CN | 204209919 U | * | 3/2015 |
| DE | 10039864 A1 | | 2/2002 |

(Continued)

OTHER PUBLICATIONS

International Search Report dated Aug. 1, 2017 for PCT/EP2017/056792 filed Mar. 22, 2017.

(Continued)

*Primary Examiner* — Michael M. Robinson
*Assistant Examiner* — Victoria Bartlett
(74) *Attorney, Agent, or Firm* — Paul D. Bianco; Gary S. Winer; Fleit Intellectual Property Law

(57) ABSTRACT

An injection moulding tool for producing at least one injection-moulded part with an outer shape and an inner shape includes at least one cavity and, for every cavity, one hot-runner nozzle connected thereto, which has an annular nozzle mouth for injecting at least one melt into the cavity. The at least one cavity is formed by a cooled die, which forms the outer form for the outer shape of the injection-moulded part to be produced, and by a core, which forms the inner form for the inner shape of the injection-moulded part to be produced. The hot-runner nozzle has a nozzle core and a hollow needle, which can be moved along the nozzle core for opening and closing the annular nozzle mouth. The nozzle core protrudes beyond the annular nozzle mouth of the hot-runner nozzle and the nozzle core forms the core of the cavity of the injection mould.

16 Claims, 3 Drawing Sheets

(56) References Cited

U.S. PATENT DOCUMENTS

| | | | |
|---|---|---|---|
| 2005/0140061 A1* | 6/2005 | Puniello | B29C 45/1642 |
| | | | 264/328.8 |
| 2010/0007058 A1* | 1/2010 | Fairy | B29C 45/2806 |
| | | | 264/328.16 |
| 2010/0183763 A1* | 7/2010 | Babin | B29C 45/2806 |
| | | | 425/549 |
| 2015/0246468 A1 | 9/2015 | Krammer | |
| 2017/0239865 A1* | 8/2017 | Koln | B29C 45/2708 |
| 2017/0334093 A1* | 11/2017 | De Almeida | B29C 45/44 |

FOREIGN PATENT DOCUMENTS

| | | | | |
|---|---|---|---|---|
| EP | 1504873 A1 | 2/2005 | | |
| JP | H08300418 A | * 11/1996 | | B29C 45/36 |
| JP | H08300418 A | 11/1996 | | |
| WO | 2014044647 A2 | 3/2014 | | |
| WO | 2015059020 A2 | 4/2015 | | |
| WO | 2016/071035 | 5/2016 | | |
| WO | 2016/071036 | 5/2016 | | |

OTHER PUBLICATIONS

Written Opinion for PCT/EP2017/056792 filed Mar. 22, 2017.
English translation of International Preliminary Report on Patentability dated Oct. 9, 2018 with Written Opinion for PCT/EP2017/056792 filed Mar. 22, 2017.
Office Action, dated Nov. 2, 2020 for Korean Patent Application No. 10-2018-7028767 (based on PCT/EP2017/0056792) (with English summary provided by Korean patent counsel).

* cited by examiner

INJECTION MOULDING TOOL

TECHNICAL FIELD

The invention relates to an injection moulding tool for producing at least one injection-moulded part with an outer shape and an inner shape. The injection-moulded part comprises at least one cavity and respectively one hot-runner nozzle connected to the cavity having an annular nozzle mouth for injecting at least one melt into the cavity.

TECHNICAL BACKGROUND

Plastic containers or container-like plastic parts are frequently produced by means of injection moulding in injection moulding tools. An injection moulding tool for such parts comprises at least one cooled cavity in which the plastic in liquid form is injected via a hot-runner nozzle through a nozzle mouth. The cavity is formed by a die which forms the outer form of the container to be produced and a core which forms the inner form of the container to be produced. The holt melt solidifies after injection in the cooled cavity and can be ejected after opening the injection moulding tool or the cavity.

In the known injection moulding tools for plastic containers with a closed base, the injection point for injecting the plastic is arranged centrally in the base region and the melt flows from the central region into a peripheral region of the injection-moulded part. In the simplest design of the injection moulding tool, the hot-runner nozzle is arranged on the die side, which also allows the manufacture of containers having a small circumference, high or narrow containers or blanks for plastic bottles.

In some injection moulding tools, simple, small-dimensioned hot-runner nozzles can also be arranged on the core side. However, this assumes that the container has a sufficiently large circumference so that the core of the injection moulding tool which extends around the hot-runner nozzle can be cooled.

In the case of container-like injection-moulded parts such as, for example tube heads or containers which have a central opening in the base, a punctuate injection is not suitable. Such injection-moulded parts are injected on the die side annularly around the opening, wherein here also the melt flows from the central region into the peripheral region of the injection-moulded part. Examples are shown in WO14044647, EP1504873, U.S. Pat. No. 9,050,747 and WO15059020.

SUMMARY OF THE INVENTION

One aspect of the invention relates to an injection moulding tool which allows a peripheral annular injection to produce injection-moulded parts in which a central injection is unsuitable or not desired.

The injection moulding tool for producing at least one injection-moulded part with an outer shape and an inner shape comprises at least one cavity and respectively one hot-runner nozzle connected to the cavity with annular nozzle mouth for injecting at least one melt into the cavity. The at least one cavity is formed by a cooled die which forms the outer form for the outer shape of the injection-moulded part to be produced and by a core which forms the inner form for the inner shape of the injection-moulded part to be produced. The hot-runner nozzle has a nozzle core and a hollow needle which is displaceable along the nozzle core for opening and closing the annular nozzle mouth. The nozzle core protrudes beyond the annular nozzle mouth of the hot-runner nozzle and forms the core of the cavity of the injection moulding tool.

In such an injection moulding tool, therefore the hot-runner nozzle at the same time forms the inner form for the inner shape of the injection-moulded part to be produced by means of the nozzle core which is axially not movable in the hot-runner nozzle. That is, the region of the nozzle core protruding over the annular nozzle mouth forms with its lateral surface and its front side the inner form of the injection-moulded part. In some places the front side of the nozzle core can contact the die so that recesses are formed in the injection-moulded part. The melt is injected into an annular gap of the cavity by the annular nozzle mouth of the hot-runner nozzle, which surrounds the nozzle core, and flows at least partially along the nozzle core in the direction of the longitudinal axis of the hot-runner nozzle. The melt then cools in the cavity and solidifies to form the injection-moulded part. Upon opening the injection moulding tool, i.e. after the die and core have been pulled apart, the injection-moulded part is ejected.

The injection moulding tool therefore allows the production of one-piece injection-moulded parts by annular injection from a peripheral region, wherein the melt flows from the peripheral region into a central region in the direction of the longitudinal axis of the hot-runner nozzle. Thus, for example, plastic containers or container-like parts can be produced in which a central injection in the base region—being this punctuate or annular—is not possible or not desired. For example, when a non-plastic part, for example, an injection needle, is to be over-moulded in the central base region.

Container-like injection-moulded parts means, in addition to plastic containers also injection-moulded parts or plastic parts which have an inner shape and an outer shape.

That is base and wall can also have recesses or the injection-moulded parts are closed or closable containers only provided with additional elements.

In some embodiments the nozzle core can comprise an inner actively cooled cooling core, in particular a water-cooled cooling core and an outer core. The outer core forms the inner form of the cavity and can be formed according to the inner shape of the desired injection-moulded part. The cooling core can have a circular cylindrical structure and allows an efficient cooling of the outer core through the nozzle. It can be used unchanged in its form for injection moulding tools having different cavities, by merely adapting the outer core to the desired inner form. Cooling core and outer core can be configured in such a manner that the front side of the cooling core forms a part of the inner form and the outer core encloses the cooling core in a sleeve-like manner. An actively cooled nozzle core can be used with a diameter from 3 mm.

In some embodiments, upstream of the nozzle mouth the nozzle core can comprise at least one insulating jacket along which the hollow needle is guided. The insulating jacket can be made of ceramic or a low heat-conducting metal or a low heat-conducting metal alloy (e.g. a chromium steel). A low heat-conducting metal/metal alloy should have a lower thermal conductivity than the metal alloy for the heated parts of the hot-runner nozzle. Preferably a thermal conductivity of less than 50λ (W/(m*K)) (measured according to DIN V 4108-4).

In some embodiments, the insulating jacket extends as far as the cavity. However, in order to achieve an even better cooling of the cavity, the outer core which is cooled can have a circumferential shoulder or a circumferential flange in the region of the nozzle mouth. The circumferential shoulder/ the circumferential flange forms one side of the nozzle mouth and can form a part of the cavity so that the cavity is completely formed by the cooled die plate, the cooled core plate and the cooled nozzle core of the hot-runner nozzle. The insulating jacket in this case reaches as far as the circumferential shoulder/flange.

In some embodiments, upstream of the nozzle mouth the outer core can have a circumferential recess in order to reduce heat or cold bridges between nozzle core and the heated parts of the hot-runner nozzle. Preferably the circumferential recess is arranged in the front region of the hot-runner nozzle in which the melt is guided closely along the nozzle core.

In some embodiments, the hot-runner nozzle can be a co-injection nozzle for injection of a concentrically layered melt flow into the cavity. In this case, the layered melt flow can consist of two outer layers of a first melt and an inner layer of a second melt. The inner layer can, for example, be a so-called barrier layer. In particular in the case of multi-layer containers or container-like injection-moulded parts, which have complex structures such as ribs, projections and recesses in the base region, as a result of turbulence of the layered melt flow it can be disadvantageous or impossible to inject this from a central point.

In some embodiments a cooled die plate can form the die.

In some embodiments the core can be cooled and arranged in a cooled core plate.

In some embodiments the hot-runner nozzle can be mounted in the cooled core plate by means of a sealing ring.

In some embodiments the hot-runner nozzle can be constructed like the co-injection nozzles described in the International Patent Applications PCT/EP2015/071667 and PCT/EP2015/071668 of the same applicant with the difference that the valve needle is a hollow needle and the co-injection nozzle has the previously described nozzle core.

Such a hot-runner nozzle or co-injection nozzle for producing multilayer injection-moulded parts comprises a first melt supply channel for a first melt; a second melt supply channel for a second melt; a central bore; a hollow needle received axially movably in the central bore for opening and closing an annular nozzle mouth; an annular inner melt channel which is formed by the central bore and the hollow needle in the upstream-directed region of the co-injection nozzle and which is fluidically connected to the first melt supply channel; an annular central melt channel which is fluidically connected to the second melt supply channel and which extends around the annular inner melt channel; an annular outer melt channel, which is connected fluidically to the first melt supply channel and which extends around the annular central melt channel; wherein the inner, central and outer melt channel are fluidically combined in the region of the nozzle tip to form a concentrically layered melt flow. The previously described nozzle core which at the same time can form the core of a cavity is arranged in the hollow needle.

The co-injection nozzle further comprises a nozzle body and a melt distributor insert which comprises the central bore. The melt distributor insert is received in a central bore of the nozzle body and preferably has a cylindrical shape which tapers towards the nozzle tip. At least one distributor channel for the first melt and at least one distributor channel for the second melt are formed along the jacket surface or the outer surface, which channels guide the respective melts in the direction of the nozzle tip.

The at least one distributor channel for the first melt can be connected fluidically upstream to the first melt supply channel and the annular inner melt channel and can be connected downstream to the annular outer melt channel. The at least one distributor channel for the first melt can have branchings downstream in order to distribute the first melt more uniformly to the annular outer melt channel.

The at least one distributor channel for the second melt can be connected fluidically upstream to the second melt supply channel and can be connected downstream to the annular central melt channel. The at least one distributor channel for the second melt can have branchings downstream in order to distribute the second melt more uniformly to the annular central melt channel. This allows an efficient and uniform distribution of the melts to annular melt channels having diameters of more than 40 mm.

The co-injection nozzle can further comprise a dividing sleeve whose inner surface partially forms the annular central melt channel and whose outer surface partially forms the annular outer melt channel.

The at least one distributor channel for the first melt can be connected downstream via a bore in the dividing sleeve to the annular outer melt channel. The dividing sleeve can have further distributor channels, preferably branched distributor channels on the other surface in order to distribute the first melt efficiently and uniformly to the annular outer melt channel.

The co-injection nozzle can also have a plurality of first and second melt supply channels which are each connected via distributor channels to the respective annular melt channels. This allows an efficient and uniform distribution of the melts to annular melt channels having large diameters of more than 40 mm.

The co-injection nozzle, in particular in relation to the branching of the distributor channels, the additional distributor channels on the dividing sleeve and/or the plurality of melt supply channels for the first and second melt can be considered to be an independent invention in itself. This is also independent of the configuration of the nozzle core, in particular independent of whether the nozzle core only extends as far as the nozzle mouth or protrudes beyond the nozzle mouth and thereby completely or partially forms a part of the cavity or whether it is cooled or not cooled. The advantage of such a co-injection nozzle lies in that it allows an annular injection with substantially greater diameters than hitherto possible. Combined with the previously described nozzle core, for example containers having a diameter of more than 40 mm can also be injected annularly from the broad side or from the peripheral side, which had not been possible hitherto.

The invention further relates to a hot-runner nozzle for one or more melts (i.e. a hot-runner nozzle for a single injection or for a co-injection) for an injection moulding tool, wherein the hot-runner nozzle has an annular nozzle mouth, a nozzle core and a hollow needle displaceable along the nozzle core for opening and closing the annular nozzle mouth. The nozzle core protrudes beyond the annular nozzle mouth of the hot-runner nozzle and in the installed state of the hot-runner nozzle, the nozzle core forms a core of a cavity of the injection moulding tool. The nozzle core can be configured as described previously.

The invention further relates to a method for producing an injection-moulded part having an inner and an outer shape using an injection moulding tool described previously. The method can comprise the following steps: a) closing the injection moulding tool to form a cooled cavity for the injection-moulded part to be injected by introducing the nozzle core of the hot-runner nozzle into the cooled die; b) injecting at least one melt into the cooled cavity through an annular nozzle mouth running around the nozzle core; and c) opening the injection moulding tool and ejecting the injection-moulded part.

In the case of co-injection of several melts as a layered melt flow with, for example, a barrier layer as inner layer, firstly only the first melt can be injected and only then the layered melt flow.

BRIEF DESCRIPTION OF THE FIGURES

The invention will be explained in detail hereinafter with reference to exemplary embodiments in connection with the drawing(s). In the figures.

DETAILED DESCRIPTION

Figure 1:
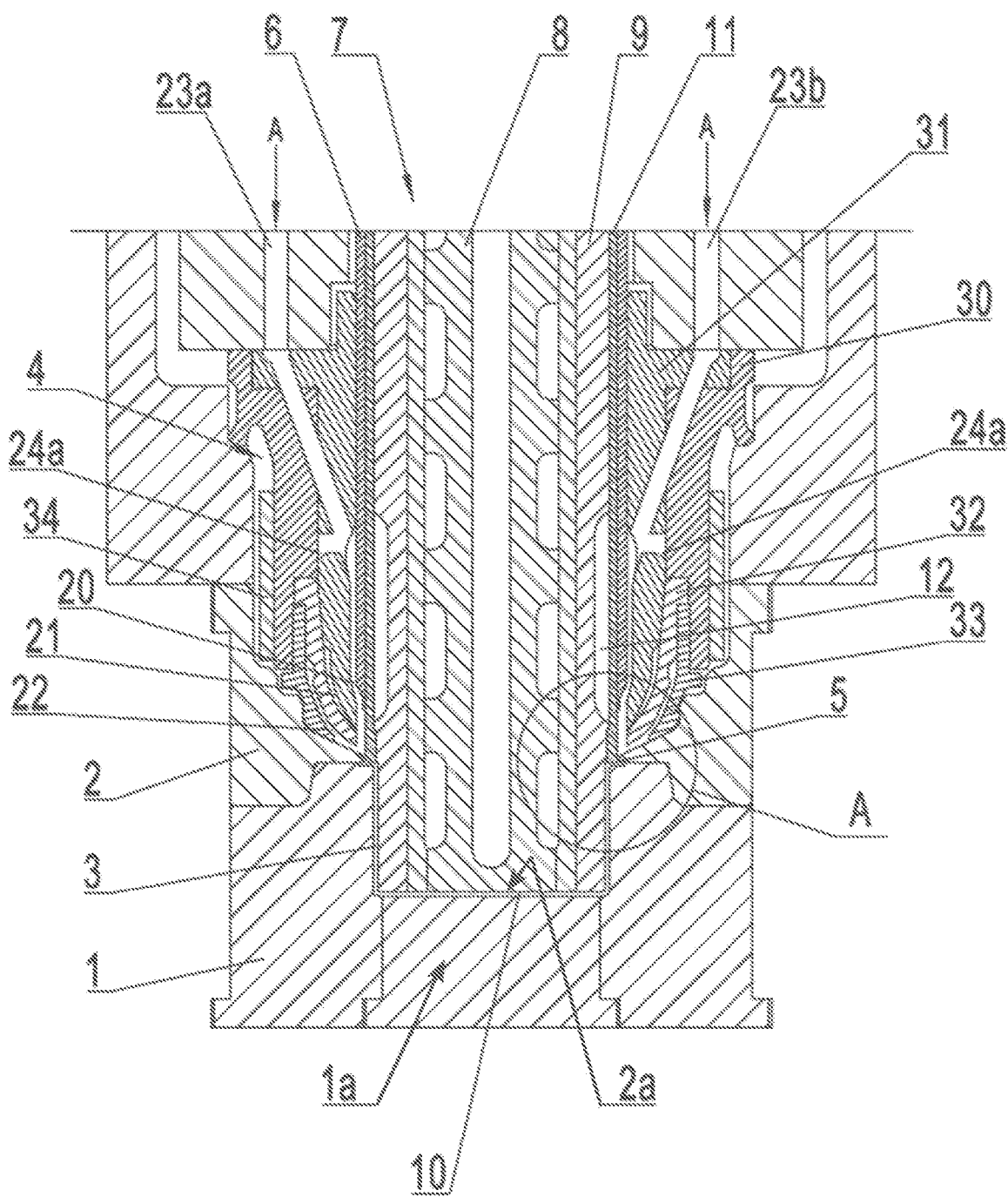
FIG. 1 shows a sectional view of an injection moulding tool.

The injection moulding tool comprises a die plate 1 which forms the die 1a for the cavity 3 and a core plate 2 which receives a hot-runner nozzle 4. The hot-runner nozzle 4 has an annular nozzle mouth 5 and a hollow needle, wherein the nozzle mouth 5 can be opened and closed by the hollow needle 6. To this end, the hollow needle 6 is guided movably along an axially non-movable nozzle core 7. The nozzle core 7 protrudes beyond the annular nozzle mouth and forms the core 2a of the cavity 3.

In the embodiment shown the nozzle core 7 comprises an inner cooling core 8 which is actively cooled with a cooling medium, in particular water, and an outer core 9. The downstream-directed end of the outer core 9 and the downstream-directed front face 10 of the cooling core 8 form the core 2a of the cavity 3, i.e. they correspond to the negative of the inner shape of the injection-moulded part to be produced. The outer core could also form the entire front face of the core 2a. In the embodiment shown, upstream of the nozzle mouth, the nozzle core 7 has an insulating jacket 11 which is made of ceramic or a less heat-conducting metal alloy (e.g. a chromium steel) than the metal alloy for the heated parts of the hot-runner nozzle 4. The insulating jacket 11 reduces the heat transfer between the hot parts of the hot-runner nozzle 4 and the cooled nozzle core 8 or outer core 9. This heat transfer is additionally reduced by a circumferential recess 12 on the jacket surface of the outer core 9 and upstream of the nozzle mouth 5. The insulating jacket 11 extends as far as the nozzle mouth 5. The hollow needle 6 is guided along the insulating jacket 11 of the nozzle core 7. The hot-runner nozzle can have more than one insulating jacket.

Figure 4:
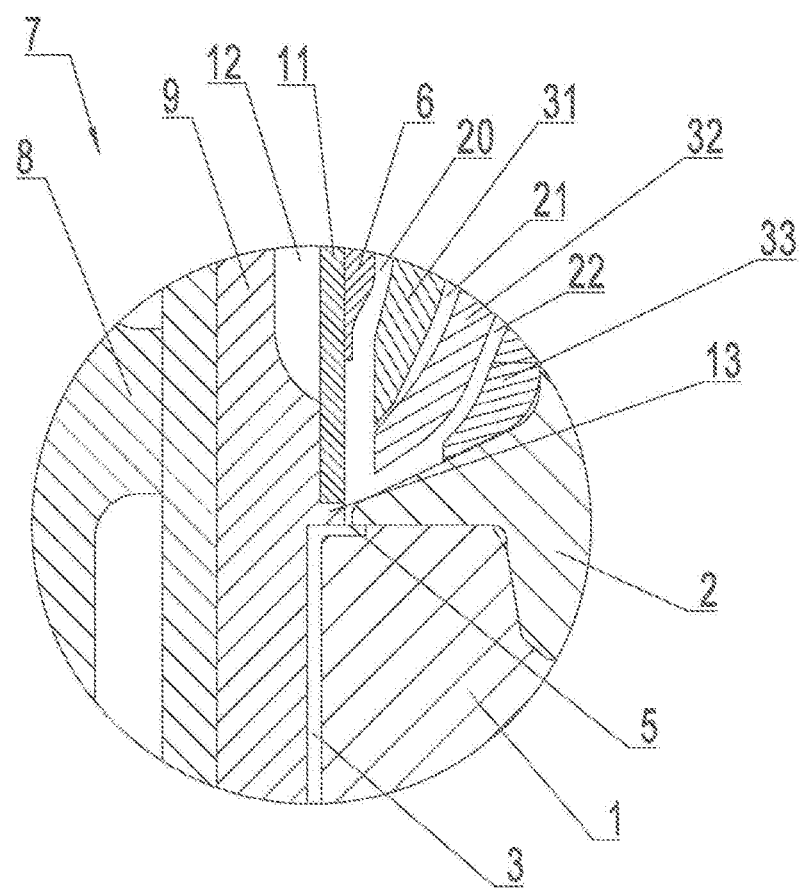
FIG. 4 shows a detailed view of a hot-runner nozzle in the area of the nozzle mouth.

In the embodiment shown in FIG. 1, the insulating jacket 11 extends as far as the cavity 3. FIG. 4 shows a detailed view of the hot-runner nozzle in the area of the nozzle mouth (circle A in FIG. 1). Unlike the hot-runner nozzle in FIG. 1, the outer core 9 of the hot-runner nozzle from FIG. 4 has a circumferential flange 13 in the area of the nozzle mouth 5. The circumferential flange 13 forms a part of the cavity 3 so that the cavity 3 is completely formed by the cooled die plate 1, the cooled core plate 2 and the cooled nozzle core 7 of the hot-runner nozzle 4. The insulating jacket 11 in this case extends only as far as the circumferential flange 13 and insulates the cooled nozzle core with respect to the heated parts of the hot-runner nozzle 4. In the co-injection nozzle shown, as will be described in detail hereinafter, these are a nozzle body 30, a melt distributor insert 31, a dividing sleeve 32 and a retaining and sealing sleeve 33. Depending on the configuration of the cavity, the circumferential flange can also be configured as a shoulder on which the insulating jacket rests.

The hot-runner nozzle can be designed for one melt or for several melts as a co-injection nozzle. In the embodiment of FIG. 1 which is shown, the hot-runner nozzle is configured as a co-injection nozzle for a triply layered melt flow having two outer layers of a first melt A and an inner layer, e.g. a so-called barrier layer, of a second melt B. In the front region upstream of the annular nozzle mouth, the co-injection nozzle has an annular inner melt channel 20, an annular central melt channel 21 and an annular outer melt channel 22. The annular inner 20 and the annular outer melt channel 22 are fluidically connected to at least one melt supply channel 23a, 23b for the first melt A. The annular central melt channel 21 is fluidically connected to at least one melt supply channel 25 for the second melt B (cannot be identified in FIG. 1 because it is arranged in front of and behind the plane of intersection).

Figure 2:
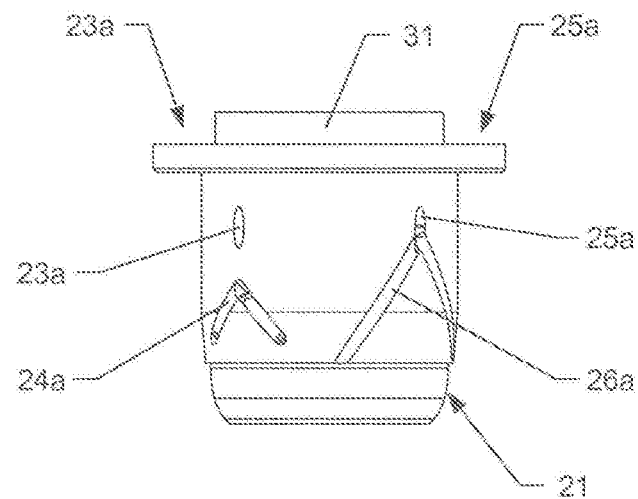
FIG. 2 shows a side view of a melt distributor insert.
Figure 3:
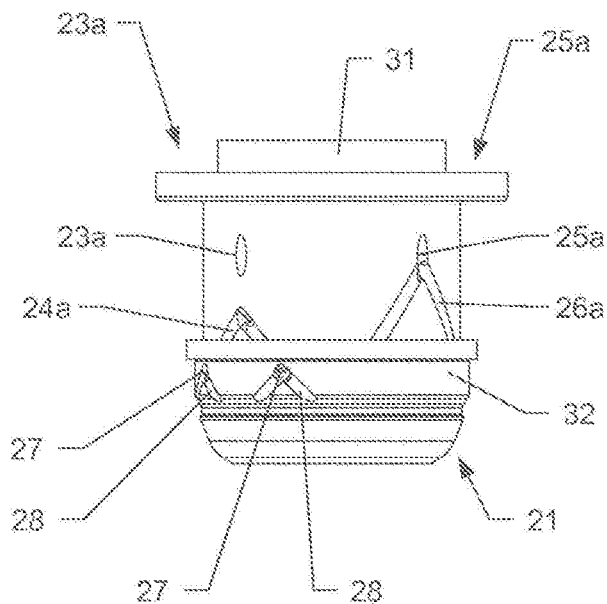
FIG. 3 shows a side view of a melt distributor insert with dividing sleeve.

The co-injection nozzle 4 shown in FIG. 1 comprises a nozzle body 30, a melt distributor insert 31, a dividing sleeve 32, and a retaining and sealing sleeve 33 (or sealing ring). The nozzle body 30 is provided with a heating element 34. FIG. 2 shows a side view of the melt distributor insert from FIG. 1. FIG. 3 shows a side view of the melt distributor insert 21 and the dividing sleeve 22 from FIG. 1.

The co-injection nozzle 4 has a central bore which extends axially through the melt distributor insert 31 and in which the hollow needle 6 is movably received. The central bore has a larger diameter in a central to lower region (i.e. downstream) than in the upper region (i.e. upstream) so that the annular inner melt channel 20 is formed along the hollow needle 6. The hollow needle 6 can also be tapered in this region in order to enlarge the cross-section of the annular inner melt channel 20. Also only the hollow needle can be configured to be tapered and the central bore can have the same diameter over the entire length. A non-movable nozzle core is arranged inside the hollow needle 6. This can be configured as the previously described cooled nozzle core 7, protrude beyond the nozzle mouth 5 of the hot-runner nozzle 4 in the flow direction of the melt and form a cooled core 2a in the core plate 2 of the injection moulding tool which forms the inner form for the inner shape of the injection-moulded part to be produced.

The annular central melt channel 21 is formed by an outer surface of the distributor insert 31 and an inner surface of the dividing sleeve 32. The annular outer melt channel 22 is formed by an outer surface of the dividing sleeve 32 and an inner surface of the retaining and sealing sleeve 33.

In the embodiment shown the annular inner melt channel 20 is connected upstream fluidically to two first melt supply channels 23a, 23b for the first melt A. Downstream it is connected fluidically to a nozzle mouth 5. The first two melt supply channels 23a, 23b for the melt A each lead from a first melt supply opening on the upper side of the melt distributor insert 31 partially through the nozzle body to the annular inner melt channel 20. Furthermore, in each case at least one melt distributor channel 24a (in FIG. 1 only the upper end can be identified) for the melt A is connected fluidically to the first two melt supply channels 23a, 23b and conducts the respective melt A into the common annular outer melt channel 22.

The melt A is therefore guided via the two melt supply channels and the respective melt distributor channels into the common annular inner melt channel 20 and the common annular outer melt channel 22.

Furthermore, in the embodiment shown the co-injection nozzle 4 comprises two second melt supply channels for the second melt B (cannot be identified in FIG. 1). In FIGS. 2 and 3 one of the two melt supply channels 25a is indicated by an arrow and its end can be identified on the outer surface of the melt distributor insert 31. The two melt supply channels for the second melt B lead like the first two melt supply channels 24a, 24b for the melt A from respective melt supply openings on the upper side of the melt distributor insert 31 partially through the nozzle body 30 to respectively at least one melt distributor channel for the second melt B. The melt distributor channels for the second melt B are fluidically connected downstream to the common annular central melt channel 21.

Both the melt distributor channels for the first melt A and also the melt distributor channels for the second melt B are formed on the outer surface of the distributor insert (e.g. by milling) and are delimited in the direction radially outwards by the inner surface of the nozzle body 30 or the dividing sleeve 32.

The melt distributor channels 24a for the first melt A end above the annular central melt channel 21. Via a through-opening 27 in the dividing sleeve 32 they are each connected to melt distributor channels 28 formed on the outer surface of the dividing sleeve 32, which are finally fluidically connected to the annular outer melt channel 22. Alternatively the bores can also lead directly into the annular outer melt distributor channel 22.

In order in particular in the case of a large diameter of the annular nozzle opening 5 to distribute the melts A, B uniformly on the annular outer and central melt channel 21, 22, the respective melt distributor channels on the outer surface of the distributor insert 31 can have a branching or bifurcations, as shown for example in FIGS. 2 and 3. The melt distributor channels on the dividing sleeve 32 can also have a branching or bifurcation. After each branching or bifurcation the cross-section of the channels can be reduced in order to achieve an approximately uniform flow rate over the entire flow section.

The annular melt flows from the annular inner, central and outer melt channels 20, 21, 22 are combined shortly before the outlet through the nozzle mouth 5 to form a concentrically layered melt flow which finally passes through the nozzle mouth 5 into the cavity 3.

REFERENCE LIST

1 Die plate
1a Die
2 Core plate
2a Core
3 Cavity
4 Hot-runner nozzle
5 Annular nozzle mouth
6 Hollow needle
7 Nozzle core
8 Cooling core
9 Outer core
10 Front face
11 Insulating jacket
12 Circumferential recess
13 Circumferential flange
20 Annular inner melt channel
21 Annular central melt channel
22 Annular outer melt channel
23a, 23b Melt supply channel for melt A
24a Melt distributor channel
25a Melt supply channel for melt B
26a Melt distributor channel for melt B
27 Through opening
28 Melt distributor channel on dividing sleeve for melt A
30 Nozzle body
31 Melt distributor insert
32 Dividing sleeve
33 Retaining and sealing sleeve/sealing ring
34 Heating element

The invention claimed is:

1. A device for producing an injection molded part having an open end defining a peripheral edge and a hollow interior, the device comprising:
   a hot runner nozzle having an annular nozzle mouth sized to inject material about the peripheral edge of the open end of the part;
   a hollow needle which is axially movable adjacent the hot runner nozzle and is dimensioned to reversibly block the nozzle mouth to admit or prevent flow of injection material through the annular nozzle mouth;
   a nozzle core that is cooled and which extends through and along an interior of the hollow needle and past the annular nozzle mouth to form the hollow interior of the part, the nozzle core having an outer surface which defines an interior surface of the hollow interior of the part;
   a die which is cooled and which is shaped and dimensioned to define an exterior surface of the part;
   the nozzle core and the die defining therebetween a cavity open at the nozzle mouth, the cavity having the shape of the part to be molded;
   an insulating jacket
      (a) interposed between and along the hollow needle and the nozzle core and terminating at the peripheral edge of the open end of the part,
      (b) surrounding the nozzle core and peripherally surrounding an interior of the hollow needle adjacent to the nozzle core,
      (c) sized and dimensioned to enable the hollow needle to slide relative to the jacket; and
      (d) formed of a low heat-conducting material,
      the insulating jacket thereby reducing heat transfer from the hot runner nozzle to the cooled nozzle core, and reducing cooling of the hot melt by the cooled nozzle core prior to injection.

2. The device of claim 1, wherein the nozzle core includes an outer core having the shape of the interior surface of the hollow interior of the part, and a cooling core that is cooled and is disposed in contact with the outer core to thereby cool the outer core.

3. The device of claim 2, wherein the outer core has a circumferential shoulder or a circumferential flange in the region of the nozzle mouth, which forms a side of the nozzle mouth.

4. The device of claim 2, wherein the outer core has a circumferential recess formed in an outer surface of the outer core, the recess positioned upstream of the nozzle mouth, the recess positioned adjacent to the insulating jacket to reduce contact between the outer core and insulating jacket, to thereby further reduce heat transfer from the hot nozzle runner through the hollow needle to the outer core.

5. The device of claim 2, wherein the cooling core is cooled using a fluid.

6. The device of claim 1, further including a core plate that is positioned downstream of the hot runner nozzle and is dimensioned to direct injection material from the hot runner nozzle to the peripheral edge.

7. The device of claim 6, wherein the core plate is cooled.

8. The device of claim 6, further including a sealing sleeve positioned between the hot-runner nozzle and the core plate.

9. The device of claim 1, wherein the hot-runner nozzle is a co-injection nozzle for injection of a concentrically layered melt flow into the cavity.

10. The device of claim 1, the low heat-conducting material selected from a ceramic or metallic material.

11. A method for producing an injection molded part using the device of claim 1, comprising:
   a) assembling the hot runner nozzle, hollow needle, nozzle core, and die together to form a cooled cavity within which the injection material is injected;
   b) injecting at least one melt into the cooled cavity through the annular nozzle mouth; and
   c) opening the injection moulding tool and ejecting the injection molded part after the part has cooled.

12. A device for producing an injection molded part having an open end defining a peripheral edge and a hollow interior, the device comprising:
   a hot runner nozzle having an annular nozzle mouth sized to inject material about the peripheral edge of the open end of the part;
   a core plate positioned downstream of the hot runner nozzle and dimensioned to direct injection material from the hot runner nozzle to the peripheral edge;
   a hollow needle which is axially movable adjacent the hot runner nozzle and is dimensioned to reversibly block the nozzle mouth to admit or prevent flow of injection material through the annular nozzle mouth;
   a nozzle core which extends through and along an interior of the hollow needle and past the annular nozzle mouth to form the hollow interior of the part, the nozzle core including an outer core which defines an interior surface of the hollow interior of the part, and an inner cooling core which cools the outer core;
   a die which defines an exterior surface of the part;
   the nozzle core and the die defining therebetween a cavity open at the nozzle mouth, the cavity having the shape of the part to be molded;
   an insulating jacket interposed between and along the hollow needle and the nozzle core and terminating at the peripheral edge of the open end of the part, the jacket surrounding the nozzle core and peripherally surrounding an interior of the hollow needle adjacent to the nozzle core, to thereby reduce heat transfer from the hot runner nozzle through the hollow needle to the outer core and inner cooling core of the nozzle core, the insulating jacket formed of a low heat-conducting material.

13. The device of claim 12, wherein the outer core of the nozzle has a recess formed in an outer surface of the outer core, the recess positioned upstream of the nozzle mouth, the recess positioned adjacent to the insulating jacket to reduce contact between the outer core and insulating jacket, to thereby further reduce heat transfer from the hot nozzle runner through the hollow needle to the outer core.

14. The device of claim 12, wherein the core plate is cooled.

15. The device of claim 12, further including a sealing sleeve positioned between the hot-runner nozzle and the core plate.

16. The device of claim 12, the insulating jacket positioned within an interior of the hollow needle and sized and dimensioned to enable the hollow needle to slide relative to the insulating jacket.

* * * * *